Figure 1:
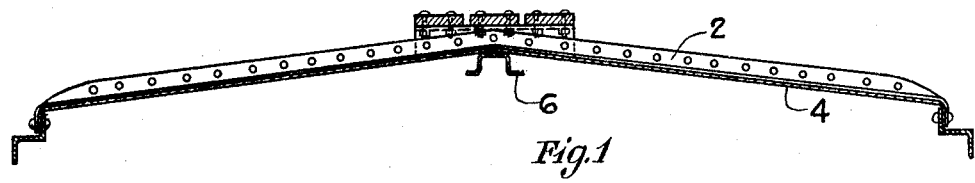

Nov. 29, 1932.  G. G. GILPIN  1,888,983
ROOF STRUCTURE FOR RAILWAY CARS
Filed June 23, 1930  3 Sheets-Sheet 1

Inventor:
Garth G. Gilpin
Attorney

Nov. 29, 1932.  G. G. GILPIN  1,888,983
ROOF STRUCTURE FOR RAILWAY CARS
Filed June 23, 1930   3 Sheets-Sheet 2

Inventor:
Garth G. Gilpin
Clinton E. Erisson
Attorney

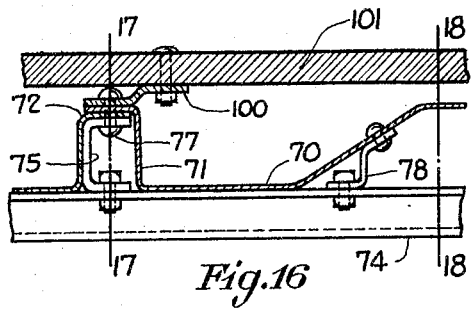
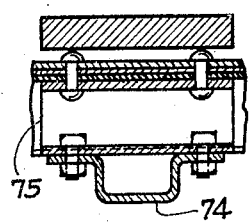
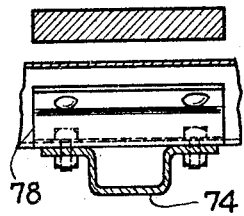
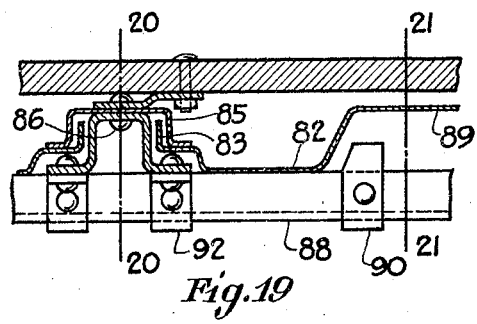
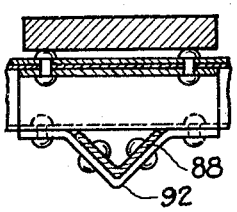
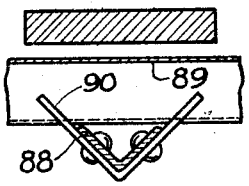
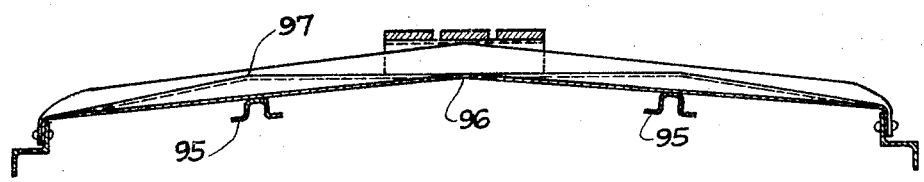

Patented Nov. 29, 1932

1,888,983

UNITED STATES PATENT OFFICE

GARTH G. GILPIN, OF RIVERSIDE, ILLINOIS, ASSIGNOR TO P. H. MURPHY COMPANY, OF NEW KENSINGTON, PENNSYLVANIA, A CORPORATION OF PENNSYLVANIA

ROOF STRUCTURE FOR RAILWAY CARS

Application filed June 23, 1930. Serial No. 463,114.

The invention relates to roofs for railway freight cars incorporating a beam for attachment of a load lifting device.

In designing a railway box car it is desirable to provide the maximum inside clear, vertical height to obtain the greatest cubical capacity of the car to facilitate the loading of automobiles and similar vehicles. The vertical outside height of the car is limited by the tunnel and bridge clearances, which clearances have been made standard by the American Railroad Association, therefore, it is expedient to provide a car roof occupying the minimum vertical space. It is also desirable to provide a railway box car with a beam for attachment of a load lifting device adjacent the roof which is capable of sustaining considerable load, as such a beam is used to raise one-half the weight of an automobile and is used to move heavy loads into or out of the car, as well as from one position to another within the car. Such a beam should be designed so that a rope or chain of a block and tackle can be thrown over it or so it can be engaged by a pair of tongs or other similar clamping means to which a load lifting device is attached.

The object of the invention is to provide a car roof structure incorporating a load supporting beam in which the vertical space occupied by the roof structure and the beam is as small as possible consistent with strength requirements.

Figure 2:
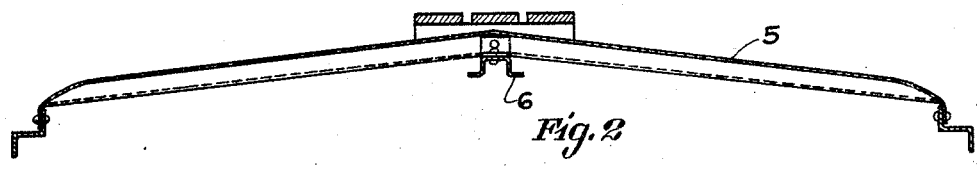
Figure 3:
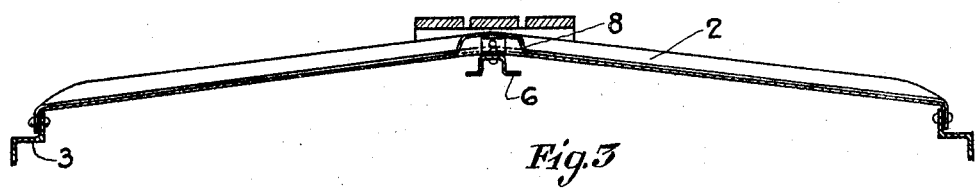
Figure 4:
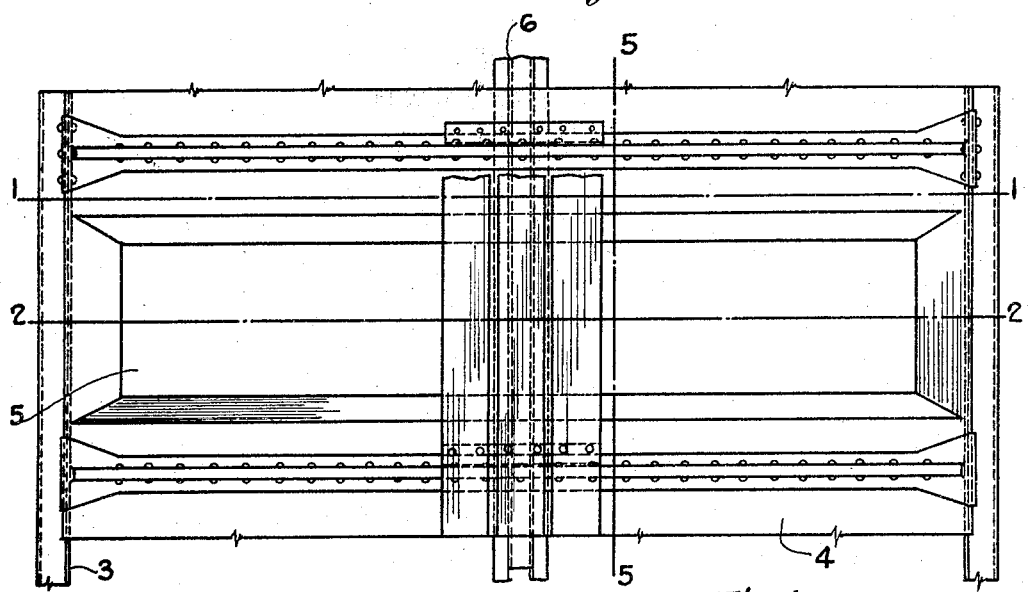
Figure 5:
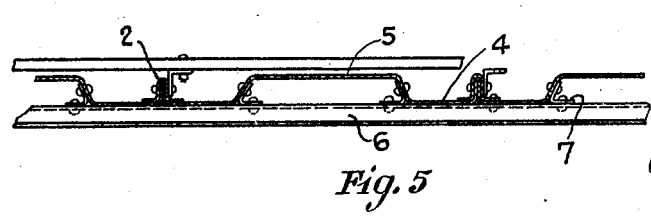
Figure 6:
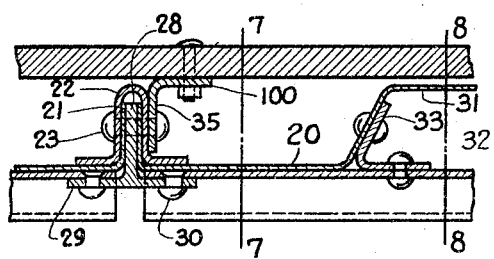
Figure 7:
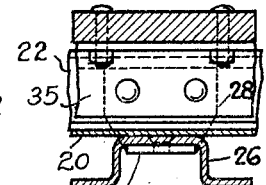
Figure 8:
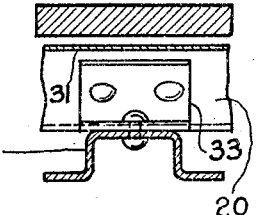
Figure 9:
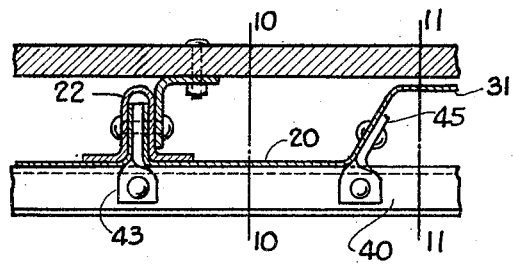
Figures 10, 11:
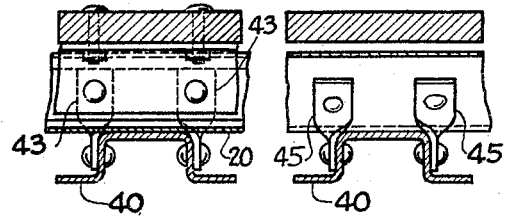
Figure 12:
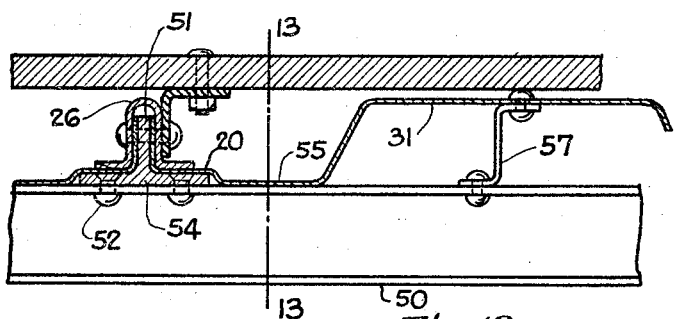
Figure 13:
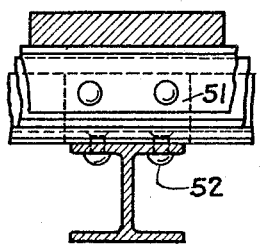
Figure 14:
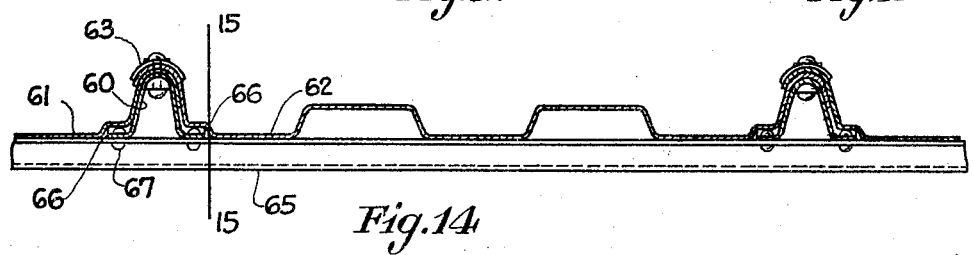
Figure 15:
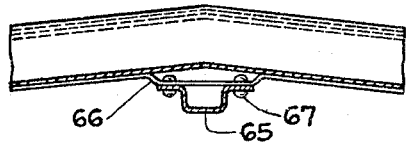

In the drawings:

Fig. 1 is a vertical transverse section through a railway car roof construction embodying my invention, the section being taken on the line 1—1 in Fig. 4, Fig. 2 is a similar section on the line 2—2 in Fig. 4, Fig. 3 is a vertical transverse section through a car roof of modified construction, Fig. 4 is a plan view of a portion of the car roof shown in Figs. 1 and 2, Fig. 5 is a vertical longitudinal section on the line 5—5 in Fig. 4, Fig. 6 is a fragmentary section similar to Fig. 5, showing a modified construction, Figs. 7 and 8 are vertical sections on the lines 7—7 and 8—8, respectively, in Fig. 6, Figs. 9, 10 and 11 are views similar to Figs. 6, 7 and 8, respectively, showing another modified construction, Figs. 10 and 11 being sectional views on the lines 10—10 and 11—11, respectively, in Fig. 9, Fig. 12 is a view similar to Fig. 9, showing another modified construction, Fig. 13 is a section on the line 13—13 in Fig. 12, Fig. 14 is a section similar to Fig. 5, showing another modified construction, Fig. 15 is a section on the line 15—15 in Fig. 14, Figs. 16, 17 and 18 are views similar to Figs. 9, 10 and 11, respectively, showing another modified construction, Figs. 17 and 18 being sectional views on the lines 17—17 and 18—18, respectively, in Fig. 16, Figs. 19, 20 and 21 are similar views of another modified construction, Figs. 20 and 21 being sections taken on the lines 20—20 and 21—21, respectively, in Fig. 19; and Fig. 22 is a vertical transverse section through another modified car roof construction.

Figs. 1 to 5 inclusive show a typical car roof structure incorporating my invention comprising carlines 2 supported by the side plates 3 and roofing 4 spanning the distance between the side plates with their adjacent margins secured to the carlines. Fig. 4 is a plan view of a part of the car roof and Fig. 1 is a cross section (1—1 of Fig. 4) through the portion of the roof sheet having the usual slope, with a carline 2 in the background. Fig. 2 is a cross section (2—2 of Fig. 4) through a portion of a roof sheet which is raised to form a panel 5 extending between opposite side plates of the car so as to constitute a beam therebetween.

The load supporting beam 6, as herein shown, is positioned adjacent the longitudinal center line of the car, and attached to as many of the carlines as deemed necessary so as to be partially supported thereby and may only extend a portion of the length of the car or may extend the entire length thereof and be secured to the opposite end walls of the car. A portion of the roofing between adjacent carlines rests upon this beam and is partially supported thereby, whereas the portion of the roofing which is paneled (as shown in Fig. 2) is spaced apart from the beam to provide a space between the beam and the roofing through which a chain or rope may be passed and to which a load lifting device is attached. The beam is attached to the panel by the bracket 7 so as to partially support the beam therefrom, which bracket also preferably provides means to prevent the chain or rope of a load lifting device from getting between the roofing and the beam. Fig. 5 is a section on line 5—5 of Fig. 4.

Fig. 3 shows a modified construction wherein the panel 8 is simply raised adjacent the longitudinal center of the car to provide a space for the chain of a load lifting device. The panel is preferably not greater than the height of the carline so as to keep the vertical thickness of the roof structure not greater than the thickness required by the carline.

Figs. 6, 7 and 8 show the arrangement incorporated in a car roof comprising a plurality of roof sheets 20 having upstanding flanges 21 at their adjacent edges and a carline-cap 22 straddling these adjacent flanges and secured thereto by the rivet 23. This cap 22 is made of sufficient strength and extends between the opposite side plates of the car and forms the carline. The load lifting beam 26 spans the distance between adjacent carlines and a plurality of such beams are preferably formed in alignment to effectually provide a continuous beam extending longitudinally of the car, and in the preferred form, this beam extends between the opposite end plates of the car and is secured thereto. A T-shaped bracket is provided having its stem 28 extending between the upstanding flanges 21 of the roof sheets and is secured thereto and to the carline-cap by the same rivets 23 which hold the roof sheets to the carline-cap. The oppositely projecting flanges 29 of the T-shaped bracket support the ends of the load lifting beams and are secured thereto by the rivets 30. Figs. 7 and 8 are sections on lines 7—7 and 8—8 respectively of Fig. 6.

The portion of the roof sheet adjacent the carline rests upon the load lifting beam 26 and is supported thereby and another portion of the roof sheet between the carlines is pressed upwardly to form a panel 31 so as to provide a space 32 above the load lifting beam for attaching of a load lifting device, such as an ice tong or block and tackle chain. This panel may be simply an embossment, as shown in Fig. 3, but preferably extends between the opposite side plates of the car, as shown in Fig. 2, so as to constitute a beam between the side plates and means are provided, such as the brackets 33, to partially support the load lifting beam 26 from the panel 31, thus the beam 26 is not only supported by the carlines 22, but also by the panel 31 at one or more places between the carlines, thus reducing the strength requirement and therefore the weight of the load lifting beam.

The brackets 33 also prevent a load lifting device, such as the chain, from slipping along the load lifting beam and getting between the roofing 20 and the beam 26. The running boards are supported from the carline by means of the saddle 35 in the usual manner.

The height of the panel 31 is not greater than the height of the carline 22 so that the space 32 provided for the attachment of a load lifting device occupies the vertical space already required by the carline, therefore, the vertical space occupied by my entire roof structure is not greater than the vertical space required by the carline and the load lifting beam.

Figs. 9, 10 and 11 show the same roof as shown in Figs. 6, 7 and 8 with a modified arrangement wherein the load lifting beam 40 is supported from the carline 22 by one or two brackets 43 which are secured to the opposite sides of the load lifting beam, the advantage of this construction being that it permits the use of a continuous one piece load lifting beam instead of a plurality of sections. The beam 40 is similarly supported from the panel 31 by brackets 45.

Figs. 12 and 13 show the same roof as shown in Figs. 6, 7 and 8 with a modified arrangement wherein a continuous beam 50 is secured to the bottom of the T-shaped bracket 51 by the rivets 52, which T-shaped bracket is secured to the carlines 26 as heretofore described. In this construction the roof sheets 20 are deflected or offset downwardly substantially the thickness of the flanges 54 of the T-shaped bracket 56 so that they rest upon and are supported by a load lifting beam 50 at 55. This offset feature has the further advantage that it deflects water away from the joint between adjacent roof sheets. In this modification a single bracket 57 is provided which suspends the load lifting beam 50 from the central portion of the panel 31.

Figs. 14 and 15 show a modified form wherein the carline 60 is positioned below the roof sheets and the adjacent roof sheets 61—62 overlap the carline and each other and are secured together by means of the rivet or clamp 63. In this modification the load lifting beam 65 is secured to the outwardly projecting lower flanges 66 of the carline by means of the rivets 67. The rivets 67 may be countersunk or the roof sheet offset slightly to overlap the rivet head, or, as in the form illustrated, the horizontal flanges 66 of the carlines are depressed so that the roof sheet escapes the rivet head. This depression is shown in Fig. 15.

Figs. 16, 17 and 18 show another modified construction wherein the roof sheets 70 are flanged (71) upwardly adjacent each other and the adjacent roof sheets are provided with reflanges 72, which are secured together to form integral carlines. The load lifting beam 74 is suspended from this integral carline by means of the bracket 75, which bracket is preferably secured to the integral carlines by means of the same rivets 77 that secure the sheets together. The bracket 78 secures the load lifting beam to the panel.

Figs. 19, 20 and 21 show the modified form applied to a so-called flexible steel roof, that is, where the roof sheets are movable relative to each other and relative to the carline. The roof sheets 82 are provided at their adjacent margins with upstanding flanges 83 which are overlapped by the cap 85, secured to the carline by rivet 86. In this case the load lifting beam 88 is not supported by the panel 89 in the movable roof sheet 82 but stops 90 are provided which are secured to the load lifting beam 88 and prevent the load lifting device from getting between the roof 82 and the beam 88. In this arrangement the load lifting beam 88 is shown as an angle with both of its arms projecting upwardly and outwardly. An angle so positioned provides an excellent load lifting beam because it is very strong for its weight and also provides a good means of attachment of a load lifting device. The load lifting beam is secured to the carline by the brackets 92.

The load lifting beam is preferably positioned adjacent the longitudinal center of the car but it or they may be located at any other place in the car and still come within the scope of the invention. In Fig. 22 I have shown a construction wherein a pair of load lifting beams 95 are spaced equi-distant from the center line 96 of the car and each panel 97 in the sheet above the beams extend from adjacent the side plate to adjacent the center line of the car.

In order to maintain a roof structure of minimum vertical thickness the running board saddles 100 are so positioned that the running boards 101 just clear the carlines (and panels), as shown in Figs. 6 and 16.

I have shown most of the load lifting beams of channel shape having oppositely extending flanges because such a beam can now be obtained from the rolling mills and furthermore, such a beam is very strong for its weight and provides a very convenient place for attachment of a tong or similar mechanical device. It is understood, however, that an I-beam, angle, T-iron or other similar section may be used and still come within the scope of the invention.

The accompanying drawings illustrate the preferred form of the invention, though it is to be understood that the invention is not limited to the exact details of construction shown and described, as it is obvious that various modifications thereof, within the scope of the claims, will occur to persons skilled in the art.

I claim:

1. In a railway car, the combination of side plates, carlines supported by the side plates, a longitudinally extending load lifting beam supported by the carlines, metal roof sheets spanning the distance between adjacent carlines and resting upon said beam, said roof sheets being provided with raised panels that serve to increase the strength of the roof and to provide spaces above the load lifting beam for attachment of a load lifting device, and means for securing said beam to the raised panels of said roof sheets.

2. In a railway car, the combination of side plates, carlines supported by the side plates, a longitudinally extending load lifting beam supported by the carlines, and metal roof sheets spanning the distance between adjacent carlines and resting upon said beam, said roof sheets being provided with raised panels that serve to increase the strength of the roof and to provide spaces above the load lifting beam for attachment of a load lifting device, the height of said panel being not greater than the height of the carline, and brackets for securing said beam to the raised panels of said roof sheets.

3. In a railway car, the combination of side plates, carlines supported by the side plates, a longitudinally extending load lifting beam supported partially by the carlines, metal roof sheets spanning the distance between adjacent carlines and resting upon said beam, said roofing being provided intermediate adjacent carlines with raised panels that provide spaces above the load lifting beam for attachment of a load lifting device, said panels being formed to function as beams between the side plates, and means to secure the load lifting beam to said panels so as to partially support the load lifting beam between adjacent carlines.

4. In a railway car, the combination of side plates, carlines supported by the side plates, a longitudinally extending load lifting beam supported partially by the carlines, roof sheets spanning the distance between adjacent carlines and resting upon said beam, said roofing being provided with raised panels that provide spaces above the load lifting beam for attachment of a load lifting device, the height of a panel being not greater than the height of a carline, said panel extending substantially from side plate to side plate midway between adjacent carlines and being formed to constitute a beam between the side plates, and means to secure the load lifting beam to the panel so as to partially support the load lifting beam between adjacent carlines.

5. In a railway car, the combination of a longitudinally extending load lifting beam, roof sheets resting upon said beam, said roof sheets being provided midway between adjacent carlines with raised panels that serve to strengthen the roof sheets and to provide spaces above the load lifting beam for attachment of a load lifting device, and means for attaching the load-lifting beam to said panels, said means comprising brackets secured to said beam and to said panels adjacent to the sides of the latter.

6. In a railway car, the combination of side plates, carlines supported by the side plates, a longitudinally extending load lifting beam supported partially by the carlines, roof sheets spanning the distance between adjacent carlines and resting upon said beam, said roof sheets being provided intermediate between adjacent carlines with raised panels that provide spaces above the load lifting beam for attachment of a load lifting device, said panels being formed to function as beams between the side plates, and means to secure the load lifting beam to the panel so as to operatively sustain the load lifting beam intermediate between adjacent carlines, said means also preventing a load lifting device from getting between the roofing and the beam.

7. A railway car construction comprising side plates, metal roof sheets extending from side plate to side plate and secured thereto and to each other, a load-lifting beam extending longitudinally of the car beneath said roof sheets, said roof sheets being provided with raised panels that extend substantially from side plate to side plate and operate to strengthen the roof and to provide spaces above said beam for accommodating a load-lifting device, and means whereby said load-lifting beam is operatively sustained by said raised panels.

8. A car roof comprising roof sheets, carlines connecting the adjacent margins of said roof sheets, said roof sheets being provided between adjacent carlines with raised panels, a load-lifting beam extending longitudinally of the car beneath said carlines and said roof sheets, and brackets for securing said load-lifting beam to said carlines and to said panels.

GARTH G. GILPIN.